Patented May 17, 1938

UNITED STATES PATENT OFFICE 2,117,858

SCREEN MATERIAL

Arthur Schleede and Bernhard Bartels, Berlin, Germany, assignors to Telefunken Gesellschaft für Drahtlose Telegraphie, m. b. H., Berlin, Germany, a corporation of Germany No Drawing. Application December 19, 1934, Serial No. 758,344. In Germany December 19, 1933

1 Claim. (Cl. 134—47)

The present invention relates to a method of producing friable or non-caking zinc sulfide, cadmium sulfide, zinc-cadmium sulfide, zinc-manganese sulfide or zinc-cadmium-manganese sulfide materials of different composition.

Luminophorous or luminescent materials with a zinc-cadmium-manganese sulfide base have become of practical importance of late for the reason that being the most luminescent materials so far known, they have been used on an increasingly greater scale in making fluorescent screens in cathode ray or Braun tubes for television purposes or for the production of X-ray fluoroscopic screens and Roentgen intensification foil. Materials with a base, as above indicated, may be obtained not only in any desired color of emission, but also with a white light of emission. However, the task of using these luminescent substances for screens is aggravated by one principal factor: after the usual preparation which consists in incandescing the sulphides in the presence of a meltable halide such as sodium chloride, they exhibit a caked structure giving the material a property as if they were moist without, however, being moist, whereas for being used to make screens a friable non-caking structure is desirable.

Systematic investigations have led to the proper understanding of this fact that a friable form of sulfide is obtainable if upon the substance, in some suitable manner, another substance suited to the said end is precipitated in small amounts. One may proceed to this end in the following manner, for instance: the finished preparation is washed with a solution of aluminum salt; this is followed by filtering with suction for thorough elimination of moisture, and washing with an ammoniac solution.

Owing to the aluminum hydroxide precipitated or deposited upon the preparation, the latter after drying, exhibits a friable or non-caking structure. This example shows to the expert quite readily that there exists a great many ways and means adapted to impart a friable or non-caking structure to the luminescent sulphide material in that suitably adapted admixtures are caused to become deposited by convenient means, for instance, carbonate or sulfate of an alkaline earth, zinc sulfide, zinc oxide, and/or zinc oxychloride. It is immaterial in this connection whether the substance in question or the decisive admixtures are incorporated therein prior to or after the incandescing process. The only thing that is essential is that they should not experience any alteration by the calcining or heating to an extent so that the friable condition fails to be obtained. For instance, a material friable or non-caking in nature is obtained in that the heated sulfide is first treated with a solution of zinc salt, for example, zinc chloride, whereupon, by simple washing with water zinc oxychloride is produced upon the preparation, or by washing with hydrogen sulfide water, zinc sulfide is precipitated. However, the zinc salt solution may be added also prior to the heating though care must be taken so that during heating the zinc salt (such as zinc chloride) will not be evaporated completely.

The production of deposits upon the crystalline structure of the preparation is attended with one drawback, namely, the screening of the material in reference to exciting as well as the emitting radiations. In the case of light and X-ray excitation, the reduction of luminosity will be hardly noticeable even where relatively heavy precipitations are concerned; but it will arise in a very marked form upon luminescent materials that have been rendered friable on being excited by cathode-rays, more particularly slow cathode rays. In the case of screens which are to be used in the manufacture of screens in cathode ray or the so-called Braun tubes, care must therefore be taken so that the deposit will be as thin as feasible, and that the same consists of a kind of material having as low as possible a specific gravity.

The deposits formed upon the fluorescent substances could, however, be utilized for a possibly advantageous practical purpose in that the same are made from a colored material in order to thereby modify the color of the emitted light of fluorescence. Another scheme would be to precipitate other luminescent substances, especially organic bodies whereby a complementary action on the emitted light is possible. By precipitations of suitable color it is also possible to diminish the stray light zone.

Another advantage obtainable in fluorescent materials rendered friable in a manner as hereinbefore disclosed compared with those materials prepared in the customary manner may be specially emphasized in this connection. The materials known in the prior art, in the presence of atmospheric moisture, are liable to blacken or tarnish with the result that the luminescence or fluorescence is greatly impaired. Preparations that have been rendered friable, on the contrary, exhibit far greater light stability.

Having now described the invention, what is claimed is:

The method of making friable luminescent aluminum oxide coated zinc sulphide, which comprises the steps of producing luminescent zinc sulphide, washing said produced zinc sulphide with a solution of aluminum salt, filtering the resultant mass, washing said resultant mass with ammonium hydroxide, drying the resulting precipitate and then calcining the said precipitate.

ARTHUR SCHLEEDE.
BERNHARD BARTELS.